United States Patent
Cao (10) Patent No.: US 9,110,682 B2
(45) Date of Patent: Aug. 18, 2015

(54) STATE MACHINE CONTROL OF A DEBUGGER

(71) Applicant: Microsoft Corporation, Redmond, WA (US)

(72) Inventor: Shiqi Cao, Seattle, WA (US)

(73) Assignee: MICROSOFT TECHNOLOGY LICENSING LLC, Redmond, WA (US)

( * ) Notice: Subject to any disclaimer, the term of this patent is extended or adjusted under 35 U.S.C. 154(b) by 163 days.

(21) Appl. No.: 13/655,480

(22) Filed: Oct. 19, 2012

(65) Prior Publication Data

US 2014/0115566 A1 Apr. 24, 2014

(51) Int. Cl.
- G06F 11/36 (2006.01)
- G06F 11/28 (2006.01)
- G06F 9/44 (2006.01)

(52) U.S. Cl.
CPC ............ *G06F 9/444* (2013.01); *G06F 11/3636* (2013.01); *G06F 11/28* (2013.01); *G06F 11/362* (2013.01)

(58) Field of Classification Search
None
See application file for complete search history.

(56) References Cited

U.S. PATENT DOCUMENTS

| | | | |
|---|---|---|---|
| 6,182,268 B1 | 1/2001 | McElvain | |
| 2005/0066312 A1* | 3/2005 | Barsness et al. | 717/129 |
| 2006/0005072 A1* | 1/2006 | Philippe Conti et al. | 714/5 |
| 2007/0168992 A1* | 7/2007 | Bates | 717/128 |
| 2008/0126877 A1* | 5/2008 | Alsup | 714/45 |
| 2008/0263521 A1* | 10/2008 | Neumann et al. | 717/125 |
| 2009/0217094 A1* | 8/2009 | Matsumoto et al. | 714/32 |
| 2010/0017185 A1 | 1/2010 | Bade et al. | |
| 2011/0029958 A1* | 2/2011 | Kalra | 717/129 |
| 2011/0087922 A1 | 4/2011 | Lee et al. | |
| 2013/0318504 A1* | 11/2013 | Eker et al. | 717/128 |

OTHER PUBLICATIONS

Alqudah, R. K., State-Based Techniques for Designing, Verifying and Debugging Message Passing Systems, Dissertation, Syracuse University, Dec. 1, 2011, 142 pages, [retrieved on Apr. 9, 2014], Retrieved from the Internet: <URL:http://surface.syr.edu/cgi/viewcontent.cgi?article=1317&context=eecs_etd>.*

Debugging with GDB, 9th Edition, Free Software Foundation, Sep. 24, 2009, 348 pages, [retrieved on Apr. 12, 2014], Retrieved from the Internet: <URL:https://web.archive.org/web/20090924024204/http://www.mirbsd.org/htman/i386/manINFO/gdb.html>.*

(Continued)

*Primary Examiner* — Thuy Dao
*Assistant Examiner* — Geoffrey St Leger
(74) *Attorney, Agent, or Firm* — Kevin Sullivan; Kate Drakos; Micky Minhas (57) ABSTRACT

A debugger utilizes a finite state machine to control when execution of a software application is suspended. The finite state machine uses breakpoints as transitions that move the finite state machine from a start state to an acceptance state. The debugger tracks when breakpoints used in the finite state machine occur. When the finite state machine reaches an acceptance state, the debugger suspends execution of the software application to allow a developer to observe and/or alter the program state or software application. The finite state machine may be generated by a developer as a graph or as a regular expression that is then converted into a finite state machine. In this manner, a developer may specify more complex conditions upon which to suspend execution of a debugger.

20 Claims, 7 Drawing Sheets

(56) References Cited

OTHER PUBLICATIONS

MPLAB X IDE User's Guide, Microchip, 2011, 4 pages, [retrieved on Feb. 13, 2014], Retrieved from the Internet: <URL:http://users.ipfw.edu/broberg/documents/MPLABXUsersGuide-52027a.pdf>.*

Burgess, P., et al., Debugging and Dynamic Modification of Embedded Systems, Proceedings of the Twenty-Ninth Hawaii International Conference on System Sciences, 1996, pp. 489-498, [retrieved on Apr. 3, 2015], Retrieved from the Internet: <URL:http://ieeexplore.ieee.org/>.*

Koch, G., et al., Breakpoints and Breakpoint Detection in Source-Level Emulation, ACM Transactions on Design Automation of Electronic Systems, vol. 3, Apr. 1998, pp. 209-230, [retrieved on Apr. 3, 2015], Retrieved from the Internet: <URL:http://dl.acm.org/>.*

Vermeulen, et al., "Automatic Generation of Breakpoint Hardware for Silicon Debug", Retrieved at <<http://ieeexplore.ieee.org/stamp/stamp.jsp?tp=&arnumber=1322535>>, Proceedings of 41st Design Automation Conference, Jun. 7, 2004, pp. 4.

"Eclipse 3.0—New and Noteworthy Debug", Retrieved at <<http://archive.eclipse.org/eclipse/downloads/drops/R-3.0-200406251208/eclipse-news-part8-R3.html>>, Jul. 13, 2007, pp. 7.

May, et al., "Designing a Parallel Debugger for Portability", Retrieved at <<http://ieeexplore.ieee.org/stamp/stamp.jsp?tp=&arnumber=288198>>, Proceedings of Eighth International Parallel Processing Symposium, Apr. 26, 1994, pp. 6.

Zhang, et al., "BPGen: An Automated Breakpoint Generator for Debugging", Retrieved at http://ieeexplore.ieee.org/stamp/stamp.jsp?tp+&arnumber=6062177>>, ACM/IEEE 32nd International Conference on Software Engineering, May 2, 2010, pp. 4.

\* cited by examiner

STATE MACHINE CONTROL OF A DEBUGGER

BACKGROUND

A debugger is a tool used by a developer to understand the operation of a program. A debugger stops execution of a program at a breakpoint so the developer can observe and/or alter the state of the program. A breakpoint can specify when execution of the program is paused. Debuggers may use different types of breakpoints. A breakpoint may be specified as a line number in a source code listing or a memory location that is accessed in a particular manner. When a breakpoint is reached, the debugger suspends execution of the program and informs the developer that the breakpoint has been reached. The developer may dump register values, alter data values, modify the source code and so forth, and when finished, the developer resumes execution of the program. The program continues execution of the program until the next breakpoint is reached or the debugger finishes execution of the program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A debugger utilizes a finite state machine to control when execution of source code is suspended to allow a developer to perform debugging operations. A finite state machine is a model of the behavior of a computation that contains a set of states and a set of transitions. A transition is a state change triggered by an event. The event may be expressed in terms of a sequence of breakpoints.

The debugger tracks execution of the breakpoints specified by the finite state machine. When the finite state machine transitions to an acceptance state, then the debugger suspends execution of the source code to allow a developer to perform debugging operations. The developer may use debug commands or operating system commands to analyze the register values, stack data, memory locations and/or to modify the source code. The debugger resumes execution of the source code and continues to track execution of other breakpoints specified by the finite state machine until the developer terminates the debugging session.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments pertain to a technology for utilizing a finite state machine to control a debugger. A developer utilizes a debugger to execute a software application in a manner that allows the debugger to suspend execution at specified points so that the developer may inspect the behavior of the runtime state of the software application and/or to modify the source code. The debugger interacts with a finite state machine in order to determine when to suspend execution of the software application. The finite state machine may be used to specify the point at which to suspend execution as a combination of breakpoints. In this way, a developer may suspend execution of the debugger automatically using more complex conditions that do not require manual intervention by the developer during the debugging session.

A finite state machine is a model of the behavior of a computation that contains a set of states and a set of transitions. A transition is a state change triggered by an event. The event may be expressed in terms of a breakpoint. The finite state machine describes a sequence of breakpoints that need to occur in a specific order in order for the debugger to suspend execution of the software application. A breakpoint may be an instruction breakpoint, a conditional breakpoint, or any other type of breakpoint. An instruction breakpoint specifies an instruction, such as a line number of an instruction in a source code listing of the software application. A conditional breakpoint specifies the occurrence of a condition, such as reading, writing, or altering a memory location, a system interrupt, detection of an I/O event, and so forth.

The debugger tracks execution of the breakpoints specified by the finite state machine. Upon the occurrence of a breakpoint, the finite state machine advances to a next state. When the finite state machine transitions to an acceptance state, then the debugger suspends execution of the source code to allow a developer (i.e., user, programmer, etc.) to debug the source code. The developer may use debug commands or operating system commands to analyze the register values, stack data, memory locations and/or to modify the source code. The debugger resumes execution of the source code, tracking execution of the breakpoints until the developer completes the debugging session.

Figure 1:
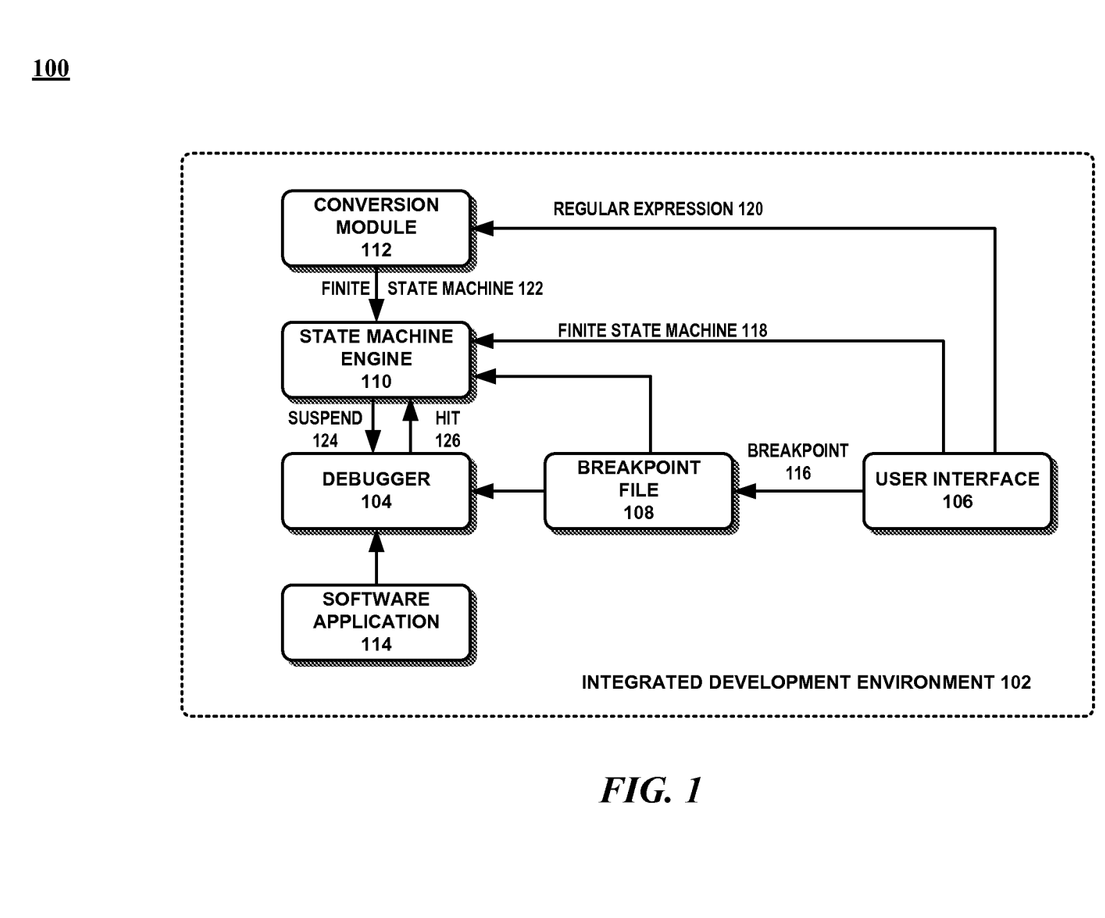
FIG. 1 is a block diagram showing an exemplary system using finite state machine control of a debugger.

Attention now turns to a more detailed description of embodiments employing a finite state machine to control a debugger. FIG. 1 illustrates an exemplary system 100 having a debugger 104, a user interface 106, a breakpoint file 108, a state machine engine 110, a conversion module 112, and a software application 114.

In one or more embodiments, the system may be part of an integrated development environment (IDE) 102. The IDE 102 may include tools, such as an editor, compiler, interpreter, libraries, and so forth (not shown). An IDE is a framework used to develop and test a software application. In one or more embodiments, the IDE 102 may be Microsoft's Visual Studio®. However, the embodiments are not limited to Visual Studio® and other IDE's may embody the techniques described herein such as without limitation, Eclipse, NetBeans, etc.

The debugger 104 is a software application that interprets each line of source code of a software application 114. The software application 114 may include source code created in one or more programming languages (e.g., Visual Basic, Visual J#, C++. C#, J#, Java Script, APL, COBOL, Pascal, Eiffel, Haskell, ML, Oberon, Perl, Python, Scheme, Smalltalk and the like), declarative languages (e.g., XML, XAML, script files, etc.) and the like.

A user interface 106 may be used to allow a developer to create breakpoints, to generate a finite state machine, or to write a regular expression that may be converted into a finite state machine. The user interface 106 may utilize elements, such as menus, icons, tool bars, keyboard shortcuts, mouse and gesture movements, buttons, dials, levers, and so on. The output of the user interface 106 may be one or more breakpoints 116, a finite state machine 118, and/or a regular expression 120. The breakpoints 116 may be stored in a breakpoint file 108. The regular expression 120 may be converted into a finite state machine 122 that is then utilized by the state machine engine 110 to control when the debugger 104 pauses execution of the software application 114.

A state machine engine 110 may be used to process a finite state machine 118. The state machine engine 110 interacts with the debugger to track when a breakpoint occurs in order to transition the finite state machine 118 to a state where the debugger 104 suspends or pauses execution of the software application 114. The state machine engine 110 receives a breakpoint file 108 containing information about each breakpoint specified in a finite state machine 118. The finite state machine 118 may be embodied in any type of data structure and may reference the breakpoints that are specified in the breakpoint file 108.

The state machine engine 110 controls the operation of the debugger 104 through a series of actions, which may be configured as messages, interrupts, and the like. The debugger may send a hit message 126 to the state machine engine 110 when a breakpoint occurs during the debugger's execution of the software application. The state machine engine 110 uses the hit message 126, identifying the breakpoint that was reached, to advance the finite state machine to a next state. When the state machine engine 110 determines that the finite state machine has reached an acceptance state, the state machine engine 110 sends the debugger 104 a suspend message 124 that signifies that the debugger 104 needs to pause execution of the software application 114.

Figure 2:
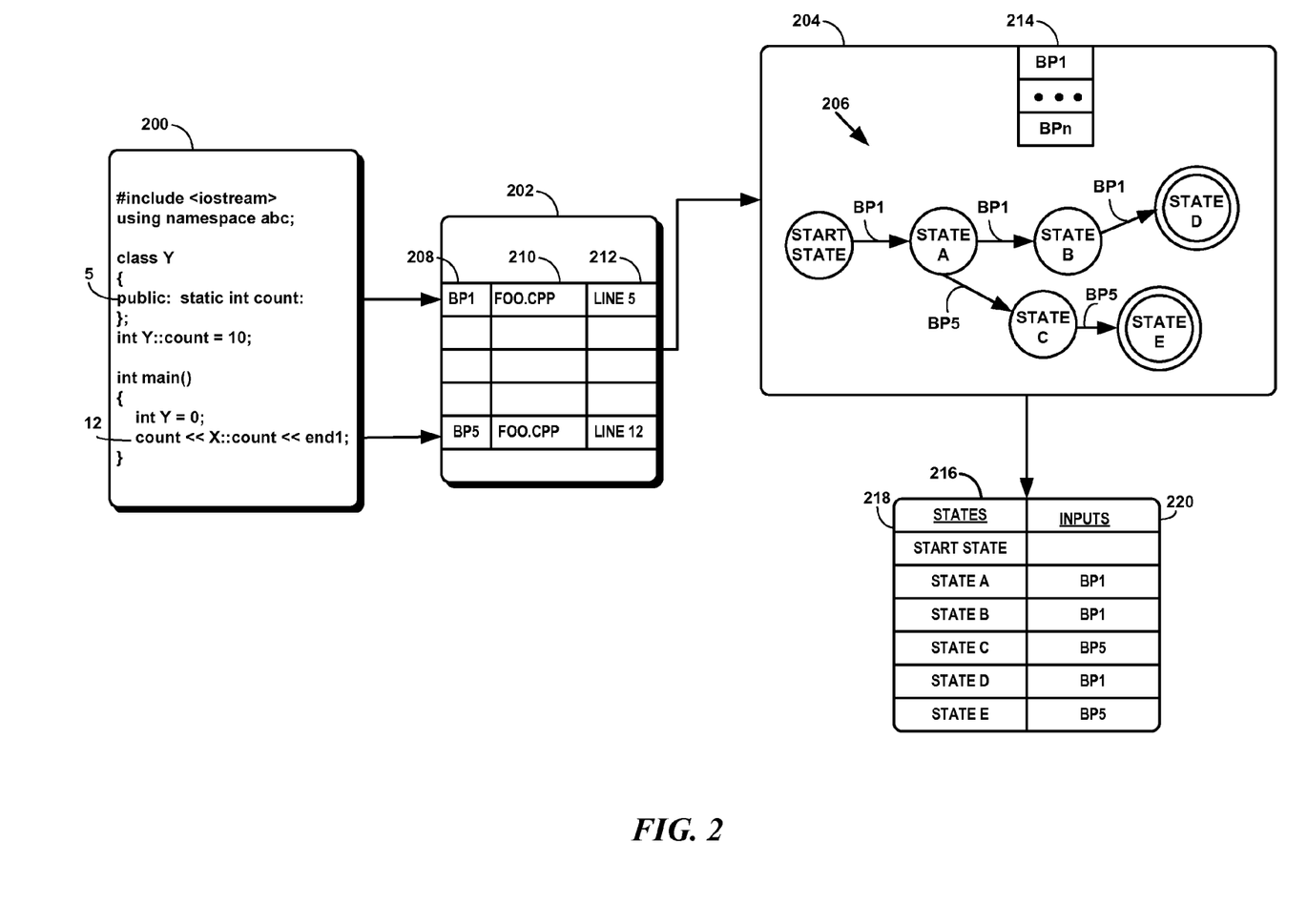
FIG. 2 is a block diagram illustrating specification of a finite state machine as a graph.

FIG. 2 illustrates an exemplary user interface 204 that may be used to create a finite state machine. Turning to FIG. 2, there is shown a source code listing 200 of a software application, a breakpoint file 202, a user interface 204 depicting a finite state machine 206, and a table 216 representing the finite state machine 206. In one or more embodiments, a developer may highlight a line in a source code listing 200 as a break point. Each breakpoint may be stored in a breakpoint file 202. Each entry in the breakpoint file 202 may include the name of the breakpoint 208, the name of the file associated with the breakpoint 210, and the line number associated with the breakpoint 212. As shown in FIG. 2, breakpoint BP1 is associated with line number 5 in file FOO.CPP and breakpoint BP5 is associated with line number 12 in file FOO.CPP.

After the breakpoints are set, a developer may use the breakpoints to create a finite state machine 206, through user interface 204. As shown in FIG. 2, the user interface 204 may contain a menu 214 listing the predefined breakpoints and tools (not shown) to create a finite state machine. As shown in FIG. 2, the finite state machine 206 may be drawn as a graphical representation, such as a directed graph.

A finite state machine is a model of the behavior of a computation. A finite state machine is defined by a finite set of states and a finite set of transitions. A transition is a change from one state to another that is triggered by an event. In one or more embodiments, a finite state machine may be depicted as a graphical representation having nodes, representing as circles, and edges, represented as lines that connect two nodes or circles. Each node represents a state and each edge represents a transition.

In one or more embodiments, the finite state machine may configured as a non-deterministic finite state automata (NFA). A NFA may be represented by a graphical representation, such as a directed graph, having a starting state and one or more final or acceptance states. A start state is a starting point of the NFA. An acceptance state represents the state where the debugger pauses execution of the software application. A start state does not have an edge going into it and an acceptance state does not have an edge leaving it. All other states between the start state and the acceptance state are considered normal states. The NFA transitions from the one state to a next state when the breakpoint associated with the edge between the two states is reached or hit.

As shown in FIG. 2, there is a finite state machine 206 having six states: a start state; state A; state B; state C; state D; and state E. The finite state machine 206 starts at the start state and advances to state A when breakpoint bp1 occurs. The finite state machine 206 advances from state A to state B when breakpoint bp1 occurs a second time. A transition from state B to state D occurs when breakpoint bp1 occurs a third time. Since state D is an acceptance state, the debugger pauses execution of the software application at this point.

The finite state machine 206 advances from state A to state C when breakpoint bp5 occurs after breakpoint bp1 is hit once. A transition from state C to state E occurs when breakpoint bp5 occurs a second time after breakpoint bp1 is hit once. Since state E is an acceptance state, the debugger pauses execution of the software application at this point.

The finite state machine 206 may be stored in a data structure, such as the exemplary table 216 shown in FIG. 2. The table 216 may have an entry for each state and contain the breakpoints that are input to each state.

In one or more embodiments, a developer may use a regular expression to specify the point at which a debugger pauses execution of a software application. A regular expression defines a pattern that matches a certain set of strings, where each string is composed of characters that are defined by a language.

A regular expression may be expressed more formally over an alphabet E as follows:

1. $\phi$ is a regular expression corresponding to the empty language;

2. $\epsilon$ is a regular expression corresponding to the language $\{\epsilon\}$;

3. For each symbol $a \in E$, a is a regular expression corresponding to the language $\{a\}$;

4. For any regular expression r and s over E, corresponding to the languages $L_R$ and $L_S$ respectively, each of the following is a regular expression corresponding to the language indicated (a) (r s) corresponding to the language $L_R L_S$ (b) (r+s) corresponding to $L_R \cup L_S$ (c) r* corresponding to the language $L_R$*

5. Only those formulas that can be produced by application of rules 1-4 are regular expressions over E.

Figure 3:
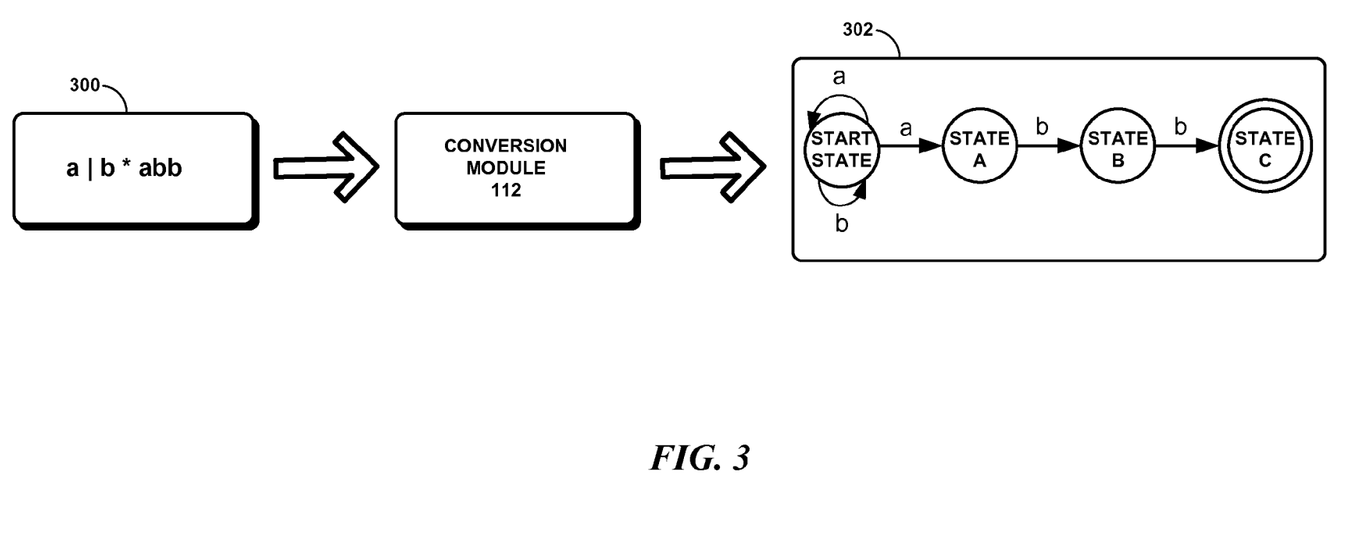
FIG. 3 is a block diagram illustrating specification of a finite state machine as a regular expression.

Referring to FIG. 3, there is shown a regular expression 300 specifying a sequence of breakpoints that need to occur in order for the debugger to suspend execution of the source code. The regular expression 300 references two breakpoints: a and b. The regular expression states that the debugger pauses whenever there is a sequence of instructions that execute in the following pattern: the instruction represented by breakpoint a or b occurs first; followed by the instruction represented by breakpoint a; followed by the instruction represented by breakpoint b twice in succession.

The regular expression 300 may then be converted into a finite state machine 302 automatically by the conversion module 112. The conversion module 302 may implement any one of the well-known algorithms that construct a finite state machine from a regular expression. Examples of such algorithms include, without limitation, the well-known Thompson construction algorithm.

The output of the conversion module 112 is a finite state machine 302. As shown in FIG. 3, FSM 302 has a start state that transitions to state A upon the occurrence of breakpoint a or breakpoint b. A transition from state A to state B occurs upon the occurrence of breakpoint b. Acceptance state D is reached upon a transition from state C to state D when breakpoint b occurs thereafter.

In one or more embodiments, the system 100 may be embodied in a computing device that may be any type of electronic device capable of executing programmable instructions. The computing device may be implemented as a mobile device, a personal digital assistant, a mobile computing device, a tablet, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, a multiprocessor system, or combination thereof.

In other embodiments, the debugger 104, state machine engine 110, and conversion module 112 may be implemented as a sequence of computer program instructions, that when executed by a processor, causes the processor to perform methods and/or operations in accordance with a prescribed task. These modules may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Although the system 100 shown in FIG. 1 has a limited number of elements in a certain configuration, the system 100 can include more or less elements in alternate configurations. For example, the debugger 104, state machine engine 110, and conversion module 112 may be configured as a software application separate from the IDE 102, or may be configured as part of another application, such as an operating system, web browser, and so forth. Furthermore, the state machine engine 110 may be incorporated into the debugger 104, either as part of the debugger 104 or as a plug-in, add-on module, component, and so forth. The embodiments are not limited to the configuration shown in FIG. 1.

Attention now turns to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 4:
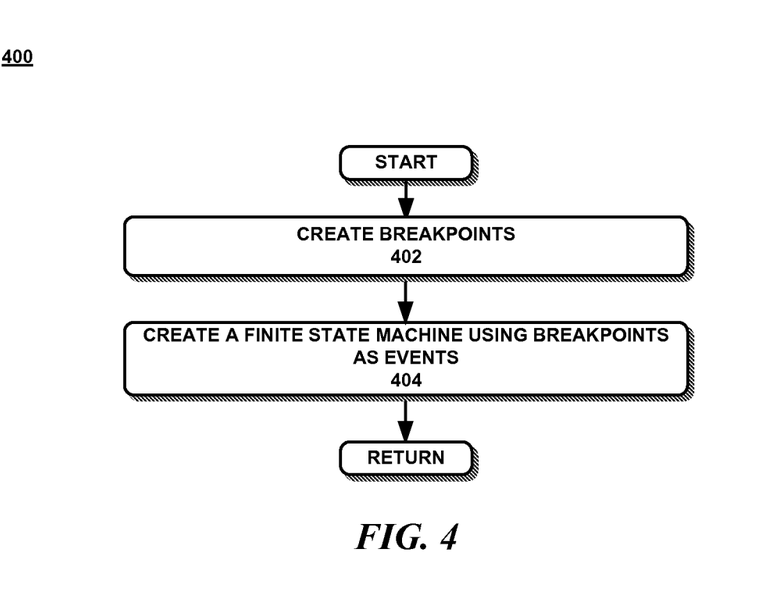
FIG. 4 is a flow diagram illustrating of a first exemplary method.

FIG. 4 illustrates a flow diagram illustrating a first exemplary method 400. A developer may create breakpoints (block 402) through the user interface 106 or in any other manner. The breakpoints may be stored in a breakpoint file 108. Once the breakpoints are created, the developer may create a finite state machine 118 that uses the breakpoints as events to transition from a start state through one or more normal states to an accepting state (block 404). The finite state machine 118 may be stored for later use.

Figure 5:
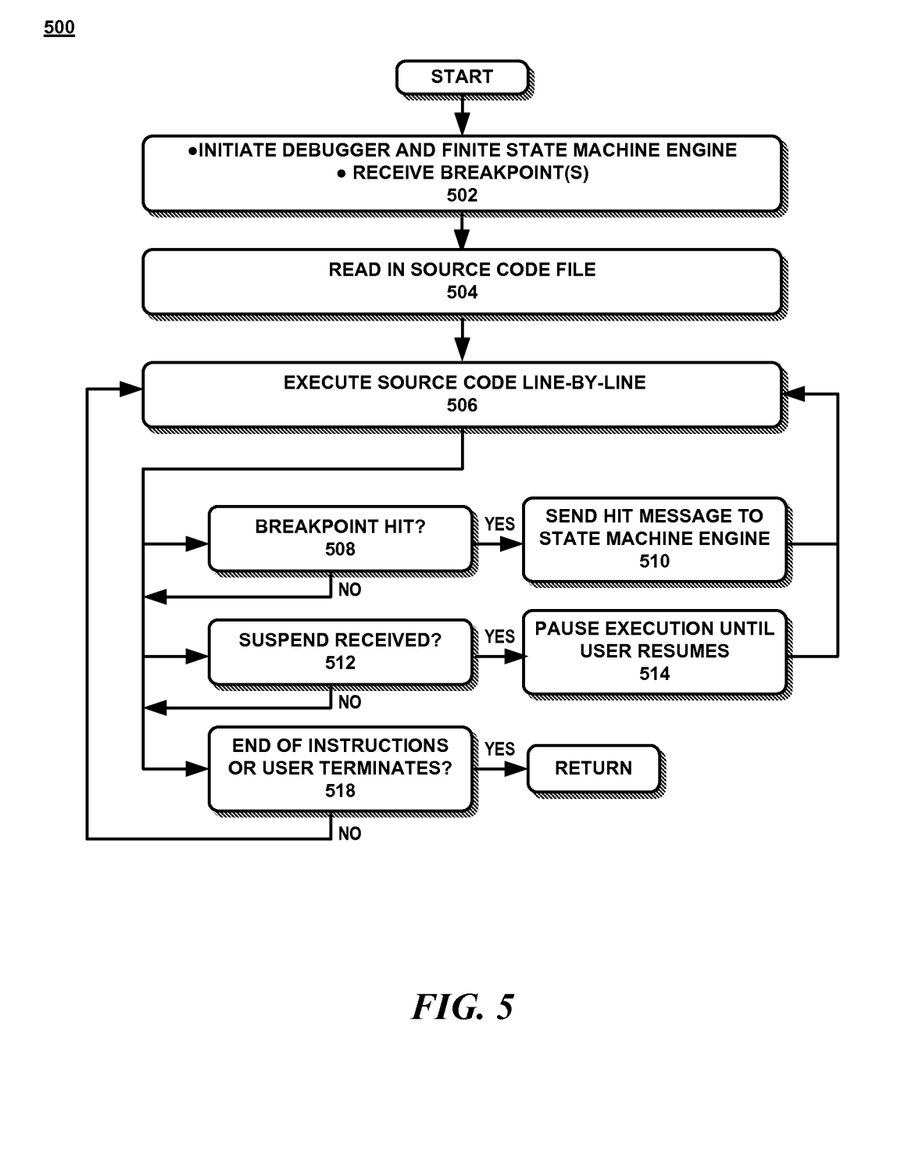
FIG. 5 is a flow diagram illustrating a second exemplary method.

FIG. 5 illustrates a flow diagram illustrating a second exemplary method 500 that is utilized by the debugger 104. A debugging session may be activated by a developer by initiating the debugger 104 and by specifying a particular finite state machine (block 502). The debugger may initiate the state machine engine 110 to process the particular finite state machine (block 502). The state machine engine 110 may transmit the breakpoints used in the finite state machine to the debugger 104 (block 502).

The debugger 104 reads in the source code of the software application 114 (block 504) and executes each line of source code line-by-line (block 506). When a breakpoint occurs or is hit (block 508-yes), the debugger 104 sends the state machine engine 110 a hit message 126 (block 510). The debugger 104 continues to send the state machine engine 110 hit messages 126 each time a breakpoint is hit (block 510).

The state machine engine 110 sends the debugger 104 a suspend message 124 when the state machine engine 110 reaches an acceptance state (block 512—yes, block 508—no). At this time, the debugger 104 pauses execution of the source code (block 514). The debugger 104 resumes execution of the source code (block 506) when the developer resumes the debugger 104 (block 514). The debugger 104 continues to execute each line of source code (block 506) until the developer 104 terminates the debugging session or the debugger 104 finishes executing all lines of the source code (block 518-yes).

Figure 6:
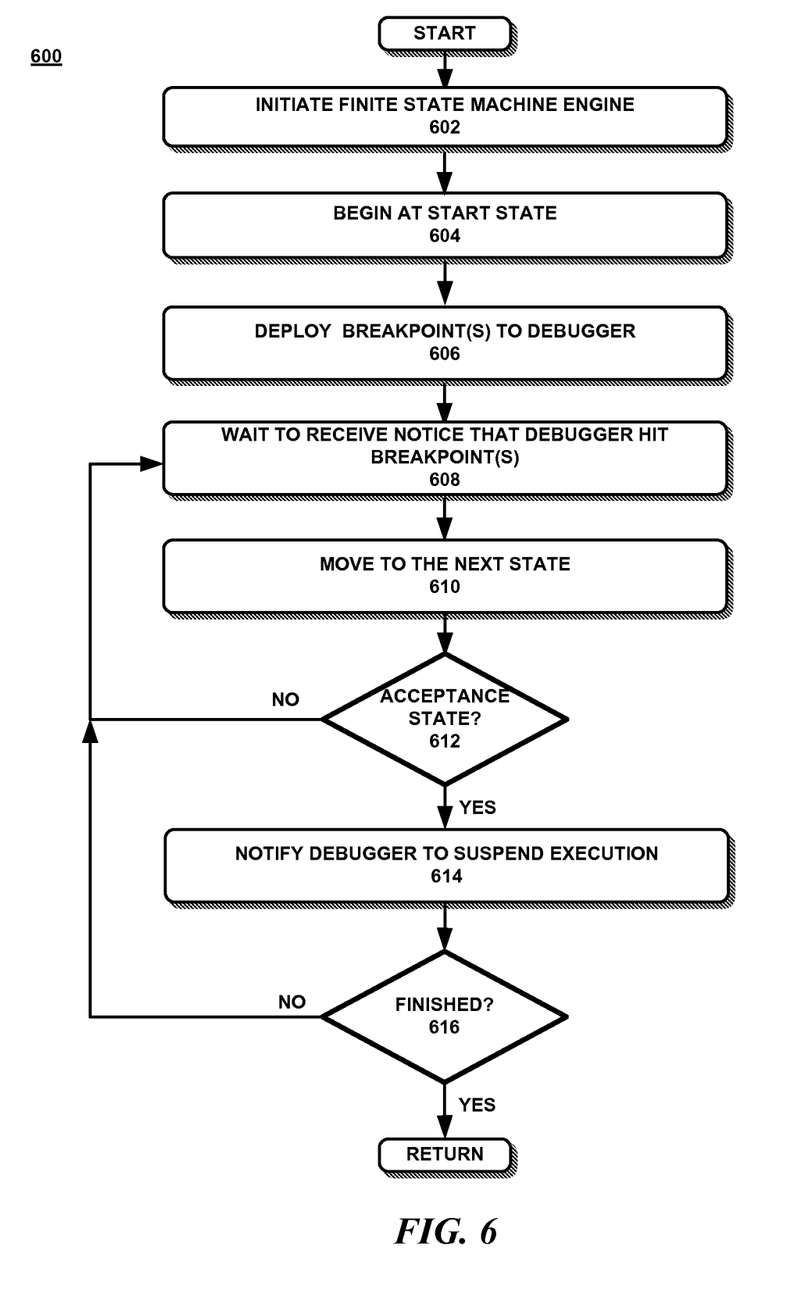
FIG. 6 is a flow diagram illustrating a third exemplary method.

FIG. 6 illustrates a flow diagram illustrating a third exemplary method 600 that is utilized by the state machine engine 110. When the developer initiates activation of the debugger 104, the state machine engine 110 is initiated (block 602). The state machine engine 110 begins at the start state (block 604) and sends the debugger 104 the breakpoints used by the finite state machine specified by the developer (block 606). The state machine engine 110 then waits to receive notification from the debugger 104 when a breakpoint has been hit (block 608). When a breakpoint has been hit (block 608), the state machine engine 110 advances the finite state machine to the next state (block 610). If the next state is an acceptance state (block 612—yes), then the finite state machine notifies the debugger 104 to suspend or pause execution (block 614). If the next state is not an acceptance state (block 612—no), then the state machine engine 110 waits to receive notice when the debugger 104 has hit another breakpoint (block 608).

Figure 7:
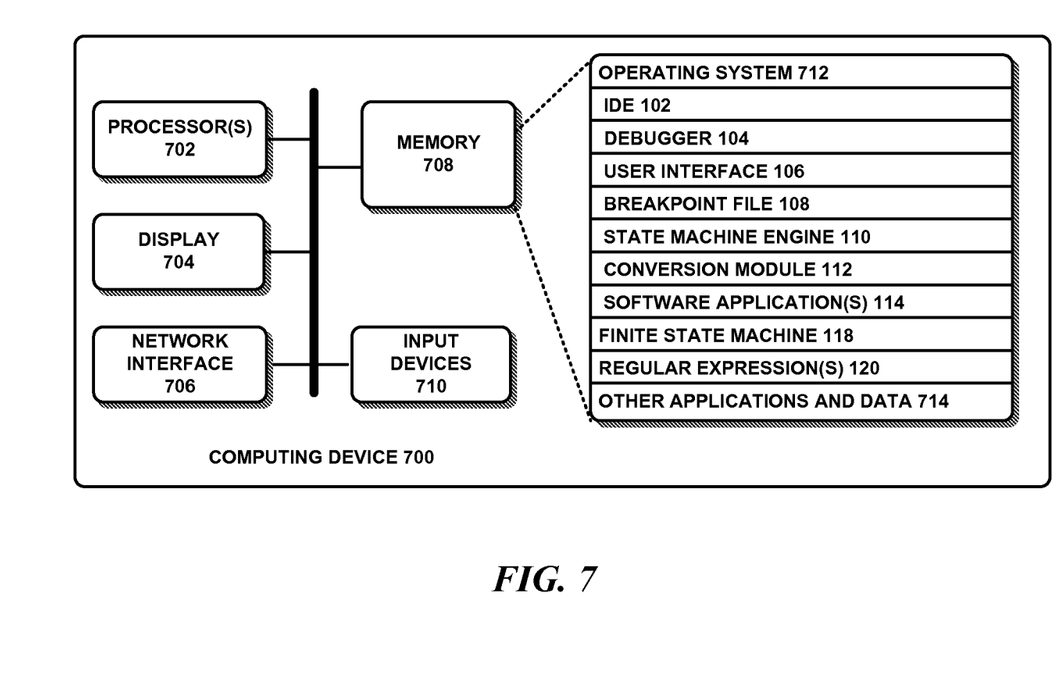
FIG. 7 is a block diagram illustrating an exemplary computing device.

Attention now turns to a discussion of an exemplary operating environment. In one or more embodiments, the system 100 may be embodied in a computing device. FIG. 7 illustrates an exemplary computing device 700. The computing device 700 may be any type of electronic device capable of executing programmable instructions. The computing device 700 may be implemented as a mobile device, a personal digital assistant, a mobile computing device, a smart phone, a cellular telephone, a tablet, a handheld computer, a server, a server array or server farm, a web server, a network server, an Internet server, a work station, a mini-computer, a mainframe computer, a supercomputer, a network appliance, a web appliance, a distributed computing system, a multiprocessor system, or combination thereof.

The computing device 700 may have one or more processors 702, a display 704, a network interface 706, a memory 708, and one or more a user input devices 710. A processor 702 may be any commercially available processor and may include dual microprocessors and multi-processor architectures. The display 704 may be any visual display unit and may include a display having a touch screen embedded within the display. The network interface 706 facilitates wired or wireless communications between the computing device 700 and a communications framework. The user input devices 710 may include a keyboard, touch screen, mouse, joystick, microphone (e.g., for voice input), and so forth.

The memory 708 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, flash memory drive, optical storage, DVD, CD, floppy disk drive, and the like. The memory 708 may also include one or more external storage devices or remotely located storage devices. The memory 708 may contain instructions and data as follows:

- an operating system 712;
- an IDE 102;
- a debugger 104;
- a user interface 106;
- a breakpoint file 108 having one or more breakpoints 116;
- a state machine engine 110;
- a conversion module 112;
- one or more software application(s) 114;
- a finite state machine 118;
- one or more regular expression(s) 120; and
- various other applications and data 714.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described with respect to a finite state machine utilizing a sequence of breakpoints, such as instruction and conditional breakpoints, the breakpoints may also include other events that occur within the computing device, such as without limitation, interrupts that signify that a software module is loaded into the computing device, an I/O device is plugged into the computing device, hardware and/or software interrupts, messages received from a network port, and so forth. The embodiments are not constrained in this manner.

What is claimed:

1. A computer-implemented method for debugging a software application, the computer-implemented method comprising the steps of:
   receiving a set of breakpoints, the set of breakpoints part of a finite state machine (FSM), the FSM having a set of states, the set of states including a start state and at least one acceptance state, each state connected to another state by at least one of the set of breakpoints, a state transitions to another state upon occurrence of a connected breakpoint;
   tracking during execution of the software application when each breakpoint occurs;
   notifying the FSM when each breakpoint occurs;
   receiving from the FSM notification that a first acceptance state has been reached, the first acceptance state representing occurrences of one or more breakpoints that transition the FSM from the start state to the first acceptance state;
   suspending execution of the software application when the FSM reaches the acceptance state; and
   performing debugging operations while execution of the software application is suspended.

2. The computer-implemented method of claim 1, further comprising:
   modifying the software application while execution of the software application is suspended.

3. The computer-implemented method of claim 1, further comprising:
   resuming execution of the software application upon receiving a user action.

4. The computer-implemented method of claim 1, further comprising:
   resuming execution of the software application upon receiving a user action;
   tracking during execution of the software application when each breakpoint occurs;
   transitioning the FSM in accordance with the breakpoints that occur; and
   suspending execution of the software application when the FSM reaches a second acceptance state.

5. The computer-implemented method of claim 1, further comprising:
   generating the FSM as a graph, the graph having a set of nodes and a set of edges, each node representing a state and each edge representing a breakpoint.

6. The computer-implemented method of claim 1, further comprising:
   generating a regular expression, the regular expression including a sequence of breakpoints; and
   converting the regular expression into a FSM.

7. The computer-implemented method of claim 1, wherein the FSM is part of an integrated development environment.

8. A computer-implemented system, comprising:
   a processor; and
   a memory comprising:
      an interactive development environment (IDE) including:
         a software application including a plurality of processor-executable instructions;
         a finite state machine (FSM) including a set of states and a set of breakpoints, each state connected to another state by at least one of the set of breakpoints, the set of states including at least one start state and at least one acceptance state, a state transitions to another state upon occurrence of a connected breakpoint, the FSM transitioning from the start state to the acceptance state upon occurrence of one or more breakpoints in the FSM from the start state to the acceptance state; and
         a debugger including processor-executable instructions that when executed on a processor, receives the set of breakpoints from the FSM, executes the processor-executable instructions of the software application, notifies the FSM when each breakpoint occurs, receives notification from the FSM that at least one acceptance state has been reached, suspends execution of the software application upon notification of the at least one acceptance state, and performs debugging operations while execution of the software application is suspended.

9. The computer-implemented system of claim 8, wherein the debugger further comprises:
a state machine engine including processor-executable instructions that when executed on a processor, tracks occurrences of the breakpoints and transitions between the states in order to determine when an acceptance state has been reached.

10. The computer-implemented system of claim 9, wherein the state machine engine further comprises processor-executable instructions that when executed on a processor notifies the debugger when an acceptance state has been reached.

11. The computer-implemented system of claim 8, wherein the debugger further comprises
a conversion module including processor-executable instructions that when executed on a processor, converts a regular expression into a FSM.

12. The computer-implemented system of claim 8, further comprising:
a user interface including processor-executable instructions that when executed on a processor, enables a developer to generate a graphical representation of the FSM.

13. The computer-implemented system of claim 8, further comprising:
a user interface including processor-executable instructions that when executed on a processor, enables a developer to generate a regular expression that specifies a sequence of breakpoints.

14. A computer-readable storage memory storing therein processor executable instructions that when executed perform actions, comprising:
receiving a set of breakpoints, the set of breakpoints part of a finite state machine (FSM), the FSM having a set of states, the set of states including a start state and at least one acceptance state, each state connected to another state by at least one of the set of breakpoints, a state transitions to another state upon occurrence of a connected breakpoint;
tracking during execution of the software application when each breakpoint occurs;
notifying the FSM when each breakpoint occurs;
receiving from the FSM notification that a first acceptance state has been reached, the first acceptance state representing occurrences of one or more breakpoints that transition the FSM from the start state to the first acceptance state;
suspending execution of the software application when the FSM reaches the acceptance state; and
performing debugging operations while execution of the software application is suspended.

15. The computer-readable storage memory of claim 14, further comprising:
modifying the software application while execution of the software application is suspended.

16. The computer-readable storage memory of claim 14, further comprising:
resuming execution of the software application upon receiving a user action.

17. The computer-readable storage memory of claim 14, further comprising:
resuming execution of the software application upon receiving a user action;
tracking during execution of the software application when each breakpoint occurs;
transitioning the FSM in accordance with the breakpoints that occur; and
suspending execution of the software application when the FSM reaches a second acceptance state.

18. The computer-readable storage memory of claim 14, further comprising:
generating the FSM as a graph, the graph having a set of nodes and a set of edges, each node representing a state and each edge representing a breakpoint.

19. The computer-readable storage memory of claim 14, further comprising:
generating a regular expression, the regular expression including a sequence of breakpoints; and
converting the regular expression into a FSM.

20. The computer-readable storage memory of claim 14, wherein the FSM is part of an integrated development environment.

* * * * *